United States Patent [19]

Teshima et al.

[11] Patent Number: 4,829,154
[45] Date of Patent: May 9, 1989

[54] PLANAR HEATER FOR LIQUID CRYSTAL ELEMENT

[75] Inventors: Toru Teshima, Yokohama; Kazuo Ariga, Tokyo; Mitsunari Yoshida, Yokohama, all of Japan

[73] Assignee: Stanley Electric Co., Ltd., Japan

[21] Appl. No.: 108,445

[22] Filed: Oct. 15, 1987

Related U.S. Application Data

[60] Continuation of Ser. No. 804,627, Dec. 5, 1985, Pat. No. 4,724,304, which is a division of Ser. No. 459,239, Jan. 19, 1983, Pat. No. 4,584,461.

[30] Foreign Application Priority Data

Jan. 22, 1982 [JP]  Japan ................................. 57-8490

[51] Int. Cl.⁴ .............................................. H05B 3/34
[52] U.S. Cl. ...................................... 219/209; 219/553
[58] Field of Search ............. 219/209, 210, 202, 203, 219/219, 220, 345, 552, 553, 543; 338/206, 208; 350/351, 331 R, 331 T

[56] References Cited

U.S. PATENT DOCUMENTS

| | | | |
|---|---|---|---|
| 2,641,675 | 6/1953 | Hannahs | 219/543 |
| 3,177,341 | 4/1965 | De Woody | 219/543 |
| 3,204,084 | 8/1965 | Spencer | 219/202 |
| 4,052,588 | 10/1977 | Nakamura | 219/548 |
| 4,392,013 | 7/1983 | Ohmura | 219/543 |

FOREIGN PATENT DOCUMENTS

| | | | |
|---|---|---|---|
| 732710 | 6/1955 | United Kingdom | 219/543 |
| 773772 | 5/1957 | United Kingdom | 219/543 |

OTHER PUBLICATIONS

"PC Heaters Warm Outdoor Readouts", Machine Design, Oct. 23, 1980.

Primary Examiner—Teresa J. Walberg
Attorney, Agent, or Firm—Louis Weinstein

[57] ABSTRACT

A planar heater for a liquid crystal element comprises a thin metal plate having a relatively high specific resistance such as stainless, nichrome, nickelchrome iron alloy, etc. The thin metal plate is subjected to etching-working to form a mesh-like heat generating body, opposite ends of which are provided with terminal portions for connection into an elecrtrical circuit.

2 Claims, 4 Drawing Sheets

PLANAR HEATER FOR LIQUID CRYSTAL ELEMENT

This is a continuation, of application Ser. No. 804,627, filed Dec. 5, 1985, which is a division of application Ser. No. 459,239, filed Jan. 19, 1983 now U.S. Pat. No. 4,594,461.

BACKGROUND OF THE INVENTION

This invention relates to a heater for a liquid crystal element.

The working characteristic of a liquid crystal element is greatly affected by the environmental temperature. As the temperature decreases, the responsiveness of the element is reduced and when the temperature reaches approximately $-30°$ C., this results in a difficulty in actual use. However, the liquid crystal element is not always used only in the environment of normal temperature, and for example, for those used as various displays for automobiles, they are desired to provide normal operation even at a temperature of approximately $-30°$ C.

In the past, in liquid crystal elements used under the environmental conditions as described above, a heat generating body is integrally disposed about the element, to which current is applied to thereby protect it from an environment of low temperature. However, this method makes it difficult to bring the whole element to an even temperature, thus failing to obtain a satisfactory result.

This invention has been achieved to cope with these circumstances. It is an object of the invention to provide a heater for a liquid crystal element which involves no difficulty in actual use even under the environment of low temperature.

DETAILED DESCRIPTION OF THE INVENTION

Figure 1:
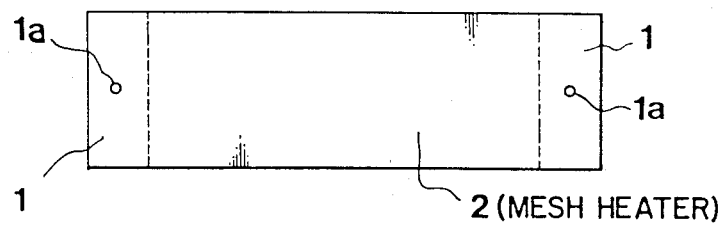
FIG. 1 is a front view of a heater in accordance with the present invention.

The present invention will now be described in detail with reference to an embodiment shown in the drawings. FIG. 1 is a front view of a heater in accordance with the present invention, which heater is formed of a material which is conductive and has a high specific resistance, for example, such as stainless, nichrome or nickel-chrome iron alloy. The heater is formed into a substantially parallelogram shape and comprises terminal portions 1, 1 on opposite ends thereof and a mesh-like heat generating portion 2 formed in the whole area except said terminal portions 1, 1. The heat generating portion 2 is shown in detail in FIG. 2 and has a mesh-like form as shown in order to evenly heat the whole surface area of the liquid crystal element, which will be described later.

Figure 3:
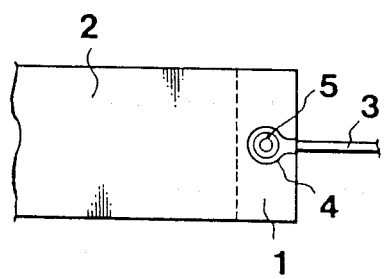
FIG. 3 is front view of a terminal portion of the heater.
Figure 4:
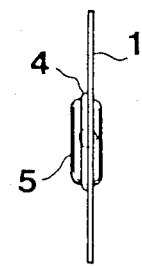
FIG. 4 is a side view of the heater looking at the righthand side of FIG. 3.

As shown in FIGS. 3 and 4 in detail, the terminal portions 1, 1 have spaces for connection of conductive lead wires 3, and the lead wires 3 are connected in openings 1a, 1a (see FIG. 1) bored therein to form conductive paths. Ring-like washers 4 are connected to the ends of the lead wires 3, which are respectively connected to said openings 1a, 1a by caulking through eyelets 5.

It will be noted that the shape of the heater can be formed in correspondence to the shape of the liquid crystal element used. If the liquid crystal element is, for example, square, the heat generating portion 2 is also formed into a shape corresponding thereto.

Figure 5:
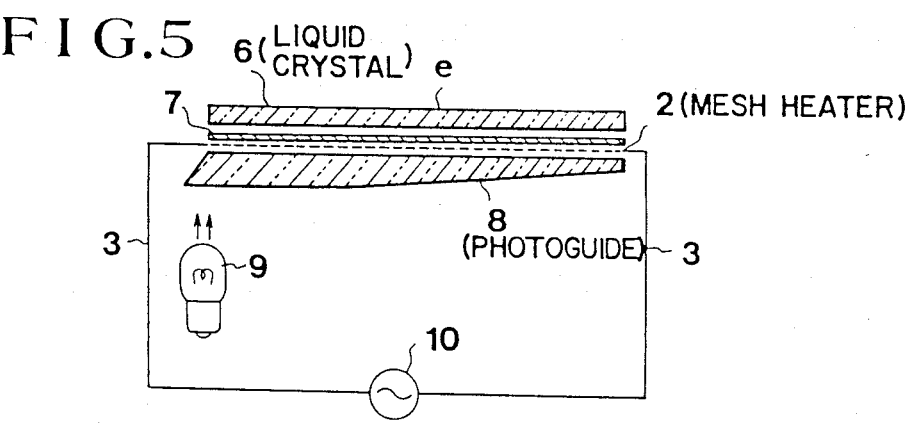
FIG. 5 is a sectional view showing the heater of FIG. 1 in use.

FIG. 5 is a sectional view showing the heater of the present invention employed in a liquid crystal. Reference numeral 6 designates a liquid crystal element, 7 a semi-permeable reflecting plate, 8 a photo-guide where the liquid crystal element 6 is displayed by back illumination, and 9 a light source for providing the back illumination. The heat generating portion 2 of the heater in accordance with the present invention is interposed between the reflecting plate 7 and the guide plate 8. Reference numeral 10 designates a power source for conduction of the heated.

Accordingly, in the heater of the present invention, it is possible to substantially evenly heat the entire area of the liquid crystal element 6 and therefore, it is possible to obtain a clear display even in a low temperature environment without producing phenomena such as irregularities in display. Particularly, the heater portion 2 is formed into a mesh-like configuration, and therefore, it is advantageous in that the mesh-like configuration intercepts only a small amount of the light illuminated from the light source 9.

EMBODIMENT 1

Figure 2:
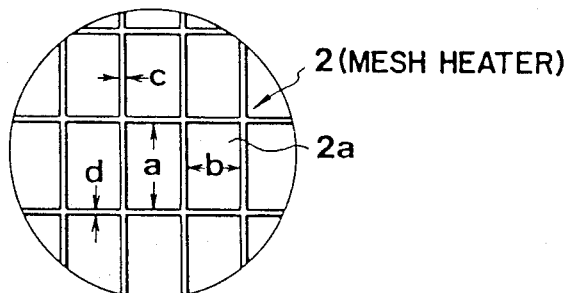
FIG. 2 is an enlarged front view showing a part of a heat generating portion.

A stainless plate (SUS-304) having plate thickness 40 $\mu$t, width 115 mm and length 245 mm was subjected to etching working to form mesh-like openings 2a (see FIG. 2). These openings 2a have dimensions of a=1.38 mm, b=0.69 mm and c, d=0.064 mm.

The heater thus obtained was arranged as shown in FIG. 5, and left alone under the environment of $-30°$ C. for sufficient cooling and thereafter, the temperatures of the liquid crystal element 6 were measured to obtain the following results. An applied voltage was 12 V, and a consumed power was 130 W.

| Time of passage (sec.) | 0 | 80 | 120 | 180 |
|---|---|---|---|---|
| Surface temperature of liquid crystal element (°C.) | $-30$ | 0 | $+12$ | $+33$ |

EMBODIMENT 2

A stainless plate (SUS-304) having a plate thickness 30 $\mu t$ was used to form a heat generating portion 2 similar to the former, and the measurement was performed to obtain the following results. An applied voltage was 12 V and a consumed power was 90 W. The temperature of the liquid crystal element was measured at the same position as that of the previous case.

| Time of passage (sec.) | 0 | 80 | 120 | 180 |
| --- | --- | --- | --- | --- |
| surface temperature of liquid crystal element (°C.) | −30 | −30 | +5 | +20 |

In either case, it was possible to obtain the elements which provide an excellent responsiveness and clear displaying action in a few minutes after commencement of conduction. Since the heat generating portion 2 is formed into a mesh-like form, there provides a good permeable property, which permeability in the aforementioned example was 97%. Accordingly, even in the case which requires back illumination, effective heating is attained while shielding only a small amount of the light.

Figure 6:
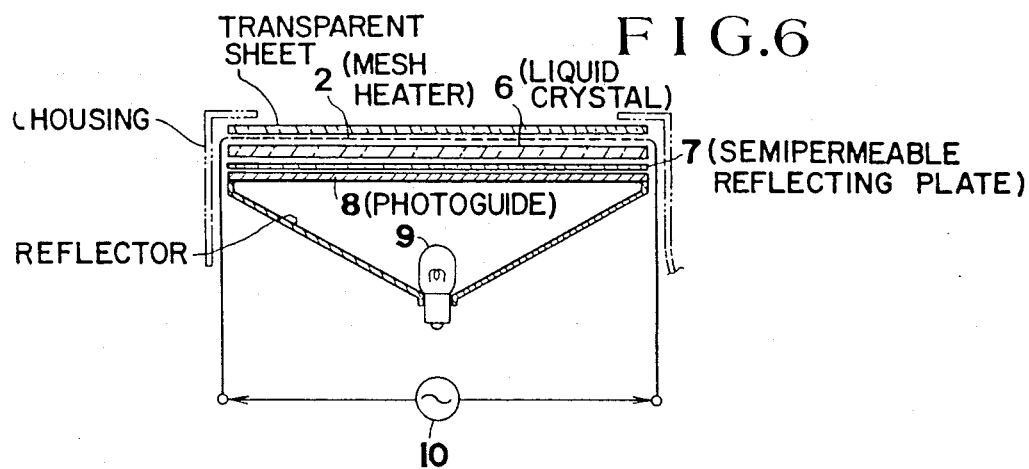
FIG. 6 is a sectional view showing the arrangement of the heater on the front surface of the liquid crystal element.
Figure 7:
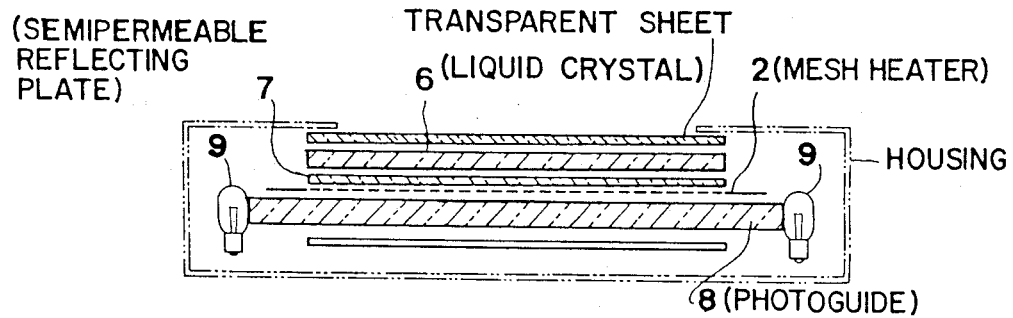
FIG. 7 is a sectional view showing the arrangement of the heater on the rear surface of the liquid crystal element.

As described above, in accordance with the present invention, a plate-like resistance is subjected to etching-working to form a mesh-like heat generating portion. Therefore, the element of the invention has effects that the whole area of the liquid crystal element may be evenly heated, that clear displaying action may be obtained even under the environment of low temperature which has heretofore made the device unusable, and that the range of utilizing the liquid crystal element may be extended. In addition, the heater itself is formed from a thin plate and has a a high degree of permeability, and therefore, the heater can be arranged on the back (FIG. 7) or front (FIG. 6) surface of the liquid crystal element without limiting the use of the heater to the position shown in the FIG. 5 embodiment. Moreover, since the heat generating portion is obtained by applying the etching treatment thereto, the size of the openings thereof or the thickness of frame portions which form a mesh, and the like can be varied according to the application and the area of the liquid crystal element. Furthermore, the mesh portion is integrally formed instead of being formed by connection, and therefore, there occurs no inconvenience in that the heat generating distribution is not concentrated on extreme portions.

While not illustrated in the embodiments, it will be understood that if a plurality of liquid crystal elements are aligned, a heat generating portion can be formed only for that portion corresponding to an area of the respective liquid crystal elements.

Furthermore, the mesh-like heat generating body can be disposed on the front surface or the rear surface of the liquid crystal element. In this case, it is possible to prevent a display pattern of the liquid crystal element from being visualized from outside when a lamp is not lit. The mesh-like heater is sufficiently rigid that it is self supporting, whereby a supporting insulating substrate is unnecessary. Also, the mesh-like heater can shield the liquid crystal element and therefore has an effect that an erroneous operation of the liquid crystal element resulting from external noise and the charged resin case of the device may be prevented. In the event the mesh-like heat generating body is arranged on the rear surface of the liquid crystal element, said mesh-like heat generating body and a permeable reflecting plate are laminated together by an ultraviolet hardening type adhesive to provide an integral configuration. In the event the mesh-like heat generating body is arranged on the front surface of the liquid crystal element use can be made of a mesh-like heat generating body formed with a lattice portion having a size corresponding to a display pattern of the liquid crystal element.

Figure 8:
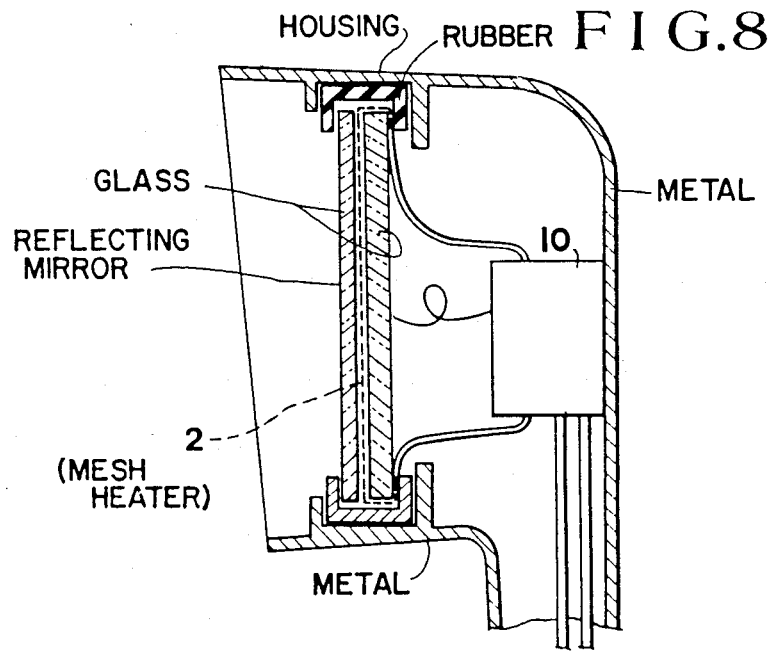
FIG. 8 is a side sectional view showing the arrangement of the heater on the rear surface of the side mirror of an automobile.
Figure 9:
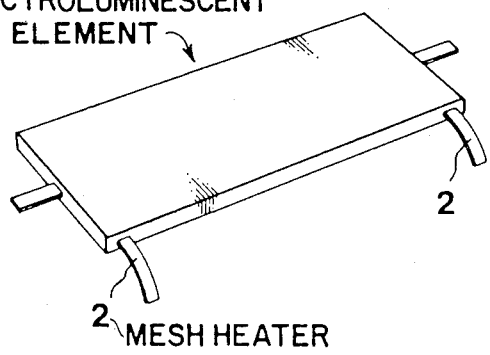
FIG. 9 is a perspective view showing the heater which is used to heat an electro-luminescence element.
Figure 10A:
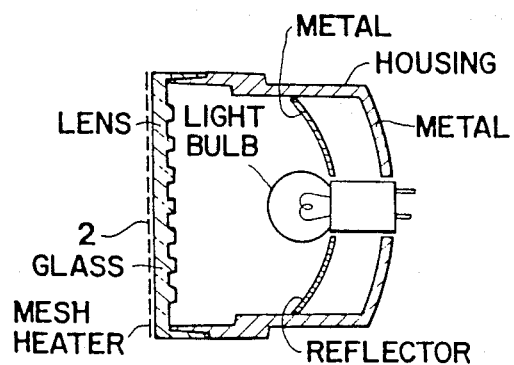
FIG. 10a and 10b are respectively side and sectional views showing the heater which is disposed together with a lens of a head lamp for the automobile.
Figure 10B:
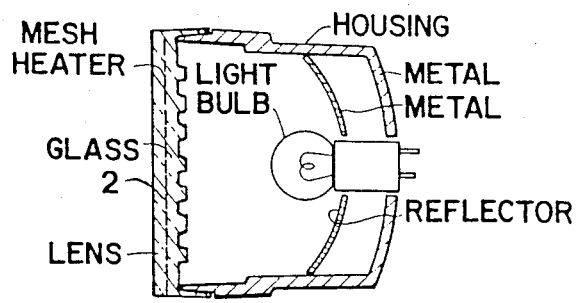

Finally, the present invention has additional applications as described below. That is, the mesh-like heat generating body 2 may be disposed on the rear surface of a side mirror of an automobile (FIG. 8) to prevent dew formation on and frost adherence to the side mirrors during the winter season. In addition, the mesh-like heat generating body can be used to heat an electroluminescence element (FIG. 9). Moreover, the mesh-like heat generating body can be disposed upon (FIG. 10a) or with (FIG. 10b) a lens of a head lamp for an automobile.

What is claimed is:

1. A planar heater directly affixed to one major face of an electro-luminescent element characterized in that a very thin highly flexible metal plate having a relatively high specific resistance is subjected to etch-working to form a mesh-like heat generating body, opposite ends of which are provided with terminal portions for connection into an electrical circuit the mesh-like body being sufficiently rigid that it is self-supporting, whereby a supporting insulating substrate is unnecessary said mesh-like heat generating body being disposed to heat the electro-luminescent element; and means for directly affixing the heater to one surface of the element so as to conform to the curvature of the said one surface.

2. The planar heater of claim 1 wherein the thickness of the metal plate is in the range of 30 $\mu$ to 40 $\mu$.

* * * * *

UNITED STATES PATENT AND TRADEMARK OFFICE
CERTIFICATE OF CORRECTION

PATENT NO. : 4,829,154

DATED : May 9, 1989

INVENTOR(S) : Toru Teshima et al.

It is certified that error appears in the above-identified patent and that said Letters Patent is hereby corrected as shown below:

At column 2, line 38, "heated" should be --heater--

At column 2, line 68, after the table and before "EMBODIMENT 2" the following paragraph should be inserted: --Note) The surface temperature of the liquid crystal element was measured at point e of Fig. 5.--

At column 4, line 20, after "element" insert --,--

Signed and Sealed this

Twentieth Day of November, 1990

Attest:

HARRY F. MANBECK, JR.

Attesting Officer

Commissioner of Patents and Trademarks